United States Patent Office 2,768,087
Patented Oct. 23, 1956

2,768,087

SILICON CARBIDE AGGREGATES

Philip Lorraine Bird, Holmbury St. Mary, Dorking, England, assignor to Monsanto Chemicals Limited, London, England, a British company No Drawing. Application May 18, 1953,
Serial No. 355,875

Claims priority, application Great Britain June 4, 1952

12 Claims. (Cl. 106—44)

This invention relates to silicon carbide (or Carborundum) aggregates, and especially to silicon carbide grindstones, such as grinding wheels.

Silicon carbide aggregates, which have important use as abrasives (e. g. in grinding wheels) and refractories, can be prepared by bonding together comminuted silicon carbide with particles of a ceramic raw material. In a commonly used method of making such aggregates, a suitably fired silicon carbide grit is mixed with a finely ground clay and dextrine in the dry state, and sufficient water is added to render the mixture workable for power-pressing or tamping by hand into a mould. The moulded composition obtained is then dried at a low temperature for about four days and fired in a kiln to approximately 1,250° C. for about a week. When this method is used for the production of grinding wheels from finely graded silicon carbide it is nevertheless frequently found that up to half of the wheels produced are cracked and so unsuitable for use that they have to be discarded. In some instances this loss may be even as much as 75%.

Another method for the manufacture of silicon carbide aggregates requires the use of a clay binding material together with a solution of sodium silicate, and grinding wheels obtained by this method, which are known as silica-bonded wheels, are found to be much softer (i. e. have a much lower crushing strength) than those obtained in the process mentioned earlier and are consequently inferior. In yet a third method for the manufacture of silicon carbide aggregates, the particles of silicon carbide are bonded together with phenolic resin, but this method is limited to the production of coarse particle size aggregates, and in any event the resulting product is of no value as a refractory as the bond is burnt out when the product is heated to high temperatures.

It is possible to bond silicon carbide particles with silica provided by a silica sol, but it is found that in ordinary circumstances the temperature of firing required to bring about the formation of a bond is then very high, about 1,710° C., and even then the strength of the bond obtained is not good enough for the product to be really satisfactory for use as a grinding wheel. Moreover, to obtain even these results, the temperature of firing has to be carefully controlled to avoid distortion of the moulded shape of the aggregate caused by melting of the silica.

It has now been discovered that a silicon carbide aggregate of good quality can be obtained by drying and firing a mixture of comminuted silicon carbide, a silica sol, and a finely divided ceramic raw material capable of reacting with the silica to form a ceramic matrix for the silicon carbide particles during the firing process. On drying and firing such a mixture an aggregate is obtained in which the silicon carbide particles are firmly held in the matrix.

This process requires firing temperatures which do not have to be rigorously controlled and which are within reasonable economic limits. The process enables the high loss due to cracking of the products on drying and firing which is mentioned above to be avoided, and provides a strong ceramic matrix between the silicon carbide particles. It can be used for fine particle size aggregates as well as those using coarser particles. Moreover the manufacture of silicon carbide abrasives and refractories using this process can be carried out in a considerably shorter time than has been necessary with processes hitherto used.

The grade of the silicon carbide particles to be used will depend on the product which is required. When the product is to be an abrasive, the particles should be of nearly uniform grain size, but a material of variable grain size is preferred when the product is to be used as a refractory. In practice the upper limit of particle size for the silicon carbide to be used is usually that corresponding to a British standard sieve of approximately 36 mesh to the inch, i. e. sieve openings of 0.0166 inch, and the lower limit is particle size corresponding to a British standard sieve of approximately 200 mesh to the inch, i. e. sieve openings of 0.003 inch. In the manufacture of comparatively coarse aggregates, particles of silicon carbide which will pass a 60 mesh British standard sieve are satisfactory, while when fine aggregates are to be produced the silicon carbide particles should be capable of passing a 180 mesh British standard sieve.

The silica sols which are suitable for use in the process of the invention include those described in British Patents Nos. 607,696, 645,703, 649,897, 654,850 and 662,423. An aqueous silica sol is preferably employed, and a silica sol obtained by the ion-exchange process is eminently suitable. Good results have been obtained using the silica sol sold under the Registered Trademark "Syton," and the colloidal solutions of silica known as "Syton W-20" and "Syton 2X" containing 15% and 30% by weight of silica respectively are especially suitable. (Syton 2X is a silica sol made by the ion-exchange process.) A sol having a silica content of from about 15% to about 30% by weight is in fact preferable.

Ceramic raw materials which are capable of reacting with the silica of the silica sol to form a strong ceramic matrix for the silicon carbide include the following:

(a) Refractory oxides which react with silica to give a refractory silicate; for example, fused alumina, zirconia.

(b) Refractory silicates which react with silica with the formation of a refractory vitreous bond, such as calcined sillimanite, calcined andalusite or calcined kyanite.

(c) Clays of high pyrometric cone equivalent (which may actually be refractory silicates of the type (b)), such as ball clay or kaolin.

(d) Mixtures of clays of high pyrometric cone equivalent with an alkali metal silicate. Examples of such mixtures in which alkali metal silicate minerals are used are kaolin-feldspar, ball clay-feldspar, kaolin-ball clay-feldspar, and kaolin-bentonite-feldspar.

These four classes of material are listed in descending order of firing temperature required to form the matrix, class (a) requiring the highest firing temperature, and give a wide range of starting materials from which the most suitable for production of any particular aggregate can be chosen. Thus super-duty refractories can be produced using materials of classes (a) and (b), high duty refractories using materials of classes (b) and (c), and low duty refractories using materials of class (d). Grinding wheels can be made using materials of any of the four classes; if the peak firing temperature is a particularly important economic factor in any instance, materials of class (d) can be used which require a comparatively low temperature for reaction with silica. When materials of class (d) are used in making grinding wheels, the disadvantages of low refractoriness of the product are mitigated by the good thermal conductivity of the silicon carbide. The materials employed for making an abrasive aggregate for use as a grinding wheel are in practice so chosen that the refractoriness of the aggregate will be as high as possible consistent with economic considerations of time and temperature of firing.

In carrying out the process of the present invention, comminuted silicon carbide of the desired fineness is therefore mixed with a silica sol and the finely divided ceramic raw material which will react with the silica to give the required matrix. The proportions of the constituents in the mixture will depend on the coarseness and the particle size distribution of the silicon carbide to be bonded, but the quantity of silica sol used is preferably chosen so as to provide a mixture which is just liquid enough to be poured with manual agitation into a mould. The proportion of the silica to the material which is to react with it is preferably so chosen that a strong matrix is formed at the lowest possible firing temperature with a minimum formation of any molten phase. It has for example been found that a mixture of 75 parts by weight of silicon carbide of particle size passing a 60 mesh British standard sieve, 25 parts of fused alumina of particle size passing a 60 mesh B. S. sieve, and 26 parts by weight of a 30% aqueous silica sol, give good results in making comparatively coarse silicon carbide grinding wheels. For fine grinding wheels, excellent results have been obtained with a mixture consisting of 75 parts of silicon carbide of particle size passing a 180 mesh B. S. sieve, 25 parts of fused alumina of particle size passing a 200 mesh B. S. sieve, and 33 parts by weight of a 30% aqueous silica sol.

It will of course be appreciated that the proportions of the ingredients must be appropriate for the results desired. Thus the quantity (by weight) of silicon carbide might be from 30 to 96% (preferably from 65 to 90%), the quantity of silica present as silica sol from 1.5 to 15% (preferably from 2 to 10%), and the quantity of ceramic raw material at least 2.5% (preferably at least 5%), the total of silicon carbide, ceramic raw material and silica being 100% in any given instance.

In order to accelerate the setting of the mixture by gelation of the silica sol, it is desirable to include a small proportion of magnesium oxide (either "light magnesia" or fused magnesia), say about 0.2% by weight of the mixture. Instead of magnesium oxide, some other alkaline substance or any inorganic salt which will act as a gelation accelerator can be used, but it is preferable to choose a material which is either volatilised off during the drying and firing process (e. g. ammonium chloride) or whose presence will not have a deleterious effect on the properties of the abrasive or refractory to be made. The most suitable proportion of accelerator to be used will depend upon the materials in the mixture, and can be determined in any given instance by simple testing: it is usually convenient to employ a proportion of magnesium oxide sufficient to cause the mixture to set solid in 20 to 30 minutes.

When the mixture has been prepared it can immediately be poured into a mould of the desired shape and size, with agitation. In order to obtain the best results, it is preferable after pouring to vibrate the mould for a few minutes by means of a suitable vibrator.

When the mixture has set solid it is smoothed off, stripped from the mould and dried in an oven. A suitable drying temperature is 85° C; the time required for drying will depend on the size of the aggregate to be produced, but for most purposes a drying time of 12 to 14 hours suffices. The dried composition is finally fired at a temperature high enough to effect reaction between the silica and the said ceramic raw material. It will be understood that normally the aggregate to be produced will be a shaped one, and when this is so, the maximum temperature of firing must not be high enough to melt the matrix so that the moulded shape is distorted; as little liquid as possible should be produced during formation of the matrix. Usually the matrix is formed by a reaction in the solid phase between the silica and the ceramic raw material used. In the firing operation, it is appropriate to increase the temperature steadily up to a maximum, maintain it at the maximum for a short time, and then allow the aggregate to cool slowly. By this means the changes effected in the composition are gradual and the appearance of cracks in the final product is avoided.

If fused alumina is employed as the material to react with the silica during the firing process, the maximum temperature reached in firing should be at least 1,400° C. and is preferably rather higher. It has been found suitable in such instances to increase the temperature during firing by about 350° C. per hour, to maintain the temperature at 1,450° C. for 2 hours, and then allow it to drop gradually to room temperature in about 20 hours. The time required for firing is not much more than 24 hours, and with a drying time of 12 hours, the total time required to produce an aggregate is well under 2 days. It will be appreciated that since in the processes hitherto commonly used for manufacture of silicon carbide refractory aggregates the time required for drying and firing is about 11 days, the process of the present invention represents a marked advance in the art of making silicon carbide aggregates.

If a mixture of kaolin and feldspar is used to form the matrix by reaction with the silica, equally good results can be obtained. It is preferred to use a mixture of kaolin and feldspar containing equal parts by weight of each material, and firing with a maximum temperature of 1,250° C. then gives good results.

The invention is illustrated by the examples given below. Where particle size is referred to in such terms as "grade 60" or "grade 180," particles of size just capable of passing through British standard sieves of 60 mesh to the inch and 180 mesh to the inch respectively are meant.

*Example 1*

Silicon carbide (75 grams) of comparatively uniform grain size and grade 60 was mixed with fused alumina (25 grams) of grade 60, powdered light magnesia (0.2 gram) of grade 300 and the 30% aqueous silica sol known as Syton 2X (22 cc., 26 grams), in that order. The mixture was poured into a greased plaster of Paris mould shaped to provide a wheel of 3 ins. diameter and 0.75 in. thickness with a 0.75 in. diameter hole in the centre, the mould not being vibrated in any way; the mixture then set in 18 minutes at a room temperature of 18° C.

The set mixture was smoothed off, stripped from the mould, and dried overnight in an oven at 85° C. The dried product was then fired by heating in a furnace, the temperature being increased at the rate of 350° C. per hour until a maximum of 1,450° C. was reached: the temperature was maintained at this maximum for 2 hours and then allowed to drop gradually. The furnace cooled from 1,450° C. to 650° C. in 4 hours, and the silicon carbide aggregate was allowed to cool in the furnace for a further 16 hours.

When the silicon carbide wheel was cold, it was removed from the furnace and was found to be free from cracks. Lead was cast in the hole in its centre and the wheel was mounted and trimmed with a diamond on a grinding lathe turning at 1,500 revolutions per minute. The wheel stood up well to the trimming operation and was, on use, found to be a good medium-soft course silicon carbide grinding wheel suitable for forming small lathe tools.

The material of the wheel had a cold crushing strength of 1,500 lbs. per square inch.

Example 2

A silicon carbide grinding wheel was prepared as in Example 1, except that only 15 cc. (18 grams) of Syton 2X were used and instead of being statically poured, the initial mixture was poured into a mould which was vibrated at a frequency of 3,000 per minute for 8 minutes and then allowed to set.

The resulting coarse grinding wheel had a cold crushing strength of 2,800 lbs. per square inch.

Example 3

Silicon carbide (75 grams) of comparatively uniform grain size and grade 180 was mixed with fused alumina (25 grams) of grade 200, powdered light magnesia (0.2 gram) of grade 300 and the 30% aqueous silica sol known as Syton 2X (27.5 cc., 33 grams), in that order, and used to make a silicon carbide grinding wheel as described in Example 1.

The resulting fine grinding wheel, which was hard and suitable for finishing steel tools, had a cold crushing strength of 4,000 lbs. per square inch.

Example 4

A grinding wheel was prepared as in Example 3, except that the quantity of Syton 2X used was 20 cc. (24 grams) and the mixture was poured into a mould vibrated as described in Example 2. The product was a very hard wheel having a cold crushing strength of 6,900 lbs. per square inch.

What we claim is:

1. A process for the production of silicon carbide aggregates comprising admixing from 30 to 96% comminuted silicon carbide, from 1.5 to 15% of silica as aqueous silica sol, and at least 2.5% of a finely divided ceramic raw material capable of reacting with the silica to form a ceramic matrix for the silicon carbide; and drying and firing the mixture in order to obtain an aggregate in which the silicon carbide particles are held in said matrix.

2. A process as defined in claim 1 in which the silica sol is one obtained by an ion exchange process.

3. A process as defined in claim 1 in which the ceramic raw material is a refractory silicate.

4. A process as defined in claim 1 in which the ceramic raw material is a clay of high pyrometric cone equivalent.

5. A process as defined in claim 1 in which the ceramic raw material is a mixture of clay of high pyrometric cone equivalent and an alkali metal feldspar.

6. A process as defined in claim 1 in which a small proportion of a gelation accelerator is incorporated in the silica sol-containing mixture.

7. A method as defined in claim 6 in which the gelation accelerator is magnesium oxide.

8. A process as defined in claim 1 in which the comminuted silicon carbide particle size is from 0.0166 to 0.003 inch in diameter.

9. A silicon carbide aggregate prepared by the process defined in claim 1.

10. A process as defined in claim 1 in which the aqueous silica sol contains from about 15 to about 30% by weight of silica.

11. A process for the production of silicon carbide aggregates comprising admixing from 30 to 96% comminuted silicon carbide, from 1.5 to 15% of silica as aqueous silica sol, and at least 2.5% of a finely divided refractory oxide capable of reacting with the silica to form a ceramic matrix for the silicon carbide, and drying and firing the mixture to obtain an aggregate in which the silicon carbide particles are firmly held in said matrix.

12. A process as defined in claim 11 in which the refractory oxide is fused alumina.

References Cited in the file of this patent

UNITED STATES PATENTS

| | | |
|---|---|---|
| 2,013,625 | Buck | Sept. 3, 1935 |
| 2,205,308 | Pirani | June 18, 1940 |